United States Patent
Gaither et al.

(10) Patent No.: US 8,911,018 B2
(45) Date of Patent: Dec. 16, 2014

(54) PASSENGER SEAT WITH NECK SUPPORT

(75) Inventors: Larry Richard Gaither, The Colony, TX (US); Paul Bentley, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 232 days.

(21) Appl. No.: 13/311,680

(22) Filed: Dec. 6, 2011

(65) Prior Publication Data

US 2012/0139309 A1 Jun. 7, 2012

Related U.S. Application Data

(60) Provisional application No. 61/549,044, filed on Dec. 6, 2010.

(51) Int. Cl.
B60N 2/48 (2006.01)

(52) U.S. Cl.
CPC ............ *B60N 2/4879* (2013.01); *B60N 2/4882* (2013.01)
USPC .......................................... 297/391; 297/408

(58) Field of Classification Search
USPC .......................................... 297/391, 406–408
See application file for complete search history.

(56) References Cited

U.S. PATENT DOCUMENTS

| | | | |
|---|---|---|---|
| 2,306,334 A * | 12/1942 | Costas | 297/407 |
| 5,108,150 A * | 4/1992 | Stas et al. | 297/397 |
| 5,370,446 A | 12/1994 | Bancod | |
| 5,531,505 A * | 7/1996 | Baetz et al. | 297/408 |
| 6,467,846 B2 * | 10/2002 | Clough | 297/410 |
| 6,616,235 B1 * | 9/2003 | Khavari et al. | 297/408 |
| 6,619,733 B2 | 9/2003 | Pearson | |
| 7,093,903 B2 * | 8/2006 | O'Connor et al. | 297/397 |
| 7,134,729 B2 | 11/2006 | Dowty et al. | |
| D539,572 S * | 4/2007 | Nguyen | D6/501 |
| 7,201,448 B2 * | 4/2007 | Williamson et al. | 297/407 |
| 2001/0040401 A1 * | 11/2001 | Lin | 297/397 |
| 2012/0080921 A1 * | 4/2012 | Vicente | 297/391 |
| 2012/0292973 A1 * | 11/2012 | Westerink et al. | 297/391 |

OTHER PUBLICATIONS

Be Aerospace Seat, Photograph of Headrest, 1 page (BE Aerospace product shown in photo known to Applicants no later than Dec. 5, 2010).

* cited by examiner

*Primary Examiner* — Peter Brown
(74) *Attorney, Agent, or Firm* — Kilpatrick Townsend & Stockton LLP; Dean W. Russell, Esq.; Tiffany L. Williams, Esq.

(57) ABSTRACT

Described are passenger seats comprising a seat back support and a neck support structure comprising a headrest coupled to the seat back support and at least one wing pivotally coupled to the headrest, wherein the at least one wing is configured to rotate downwardly from a stowed position to a first deployed position and the at least one wing is also configured to rotate laterally from the stowed position to a second deployed position. The neck support structure may comprise a first wing and a second wing. A cover may be removably coupled to the at least one wing. The at least one wing may be formed from a flexible material.

15 Claims, 4 Drawing Sheets

PASSENGER SEAT WITH NECK SUPPORT

CROSS REFERENCE TO RELATED APPLICATIONS

This application is related to and claims priority benefits from U.S. Provisional Application Ser. No. 61/459,044, filed on Dec. 6, 2010, entitled "NECK SUPPORT." The '044 application is hereby incorporated in its entirety by this reference.

FIELD OF THE INVENTION

The field of the invention relates to passenger seats. More specifically, it relates to passenger seats with enhanced neck and head support for the passenger.

BACKGROUND

In various modes of transportation, a passenger may be subjected to a passenger seat for various lengths of time. In airline travel, for example, it is not uncommon for a passenger to be seated in a passenger seat for multiple hours. During such time, it is beneficial to the passenger's overall health if the passenger's neck and head are properly supported.

Traditional passenger seats, with fixed orientation positions, cannot be adequately adjusted to provide each passenger with the head or neck support (or comfort level) that he or she requires. As a result, passengers typically bring personal items, such as pillows and blankets, on board to achieve such support. These items may be quite cumbersome, however, and typically intrude into the personal space of another passenger.

Thus, it may be desirable to provide passenger seats with easily adjustable structures to support each passenger's neck and/or head, while eliminating the need of personal items to achieve a similar result.

SUMMARY

Certain embodiments of the present invention include passenger seats comprising a seat back support and a neck support structure comprising a headrest coupled to the seat back support and at least one wing pivotally coupled to the headrest, wherein the at least one wing is configured to rotate downwardly from a stowed position to a first deployed position, and wherein the at least one wing is also configured to rotate laterally from the stowed position to a second deployed position.

In some embodiments, the neck support structure may comprise a first wing and a second wing.

In some embodiments, the at least one wing may be configured to rotate upwardly from a stowed position to a deployed position.

In some embodiments, a cover may be removably coupled to the at least one wing.

DETAILED DESCRIPTION

Figure 1:
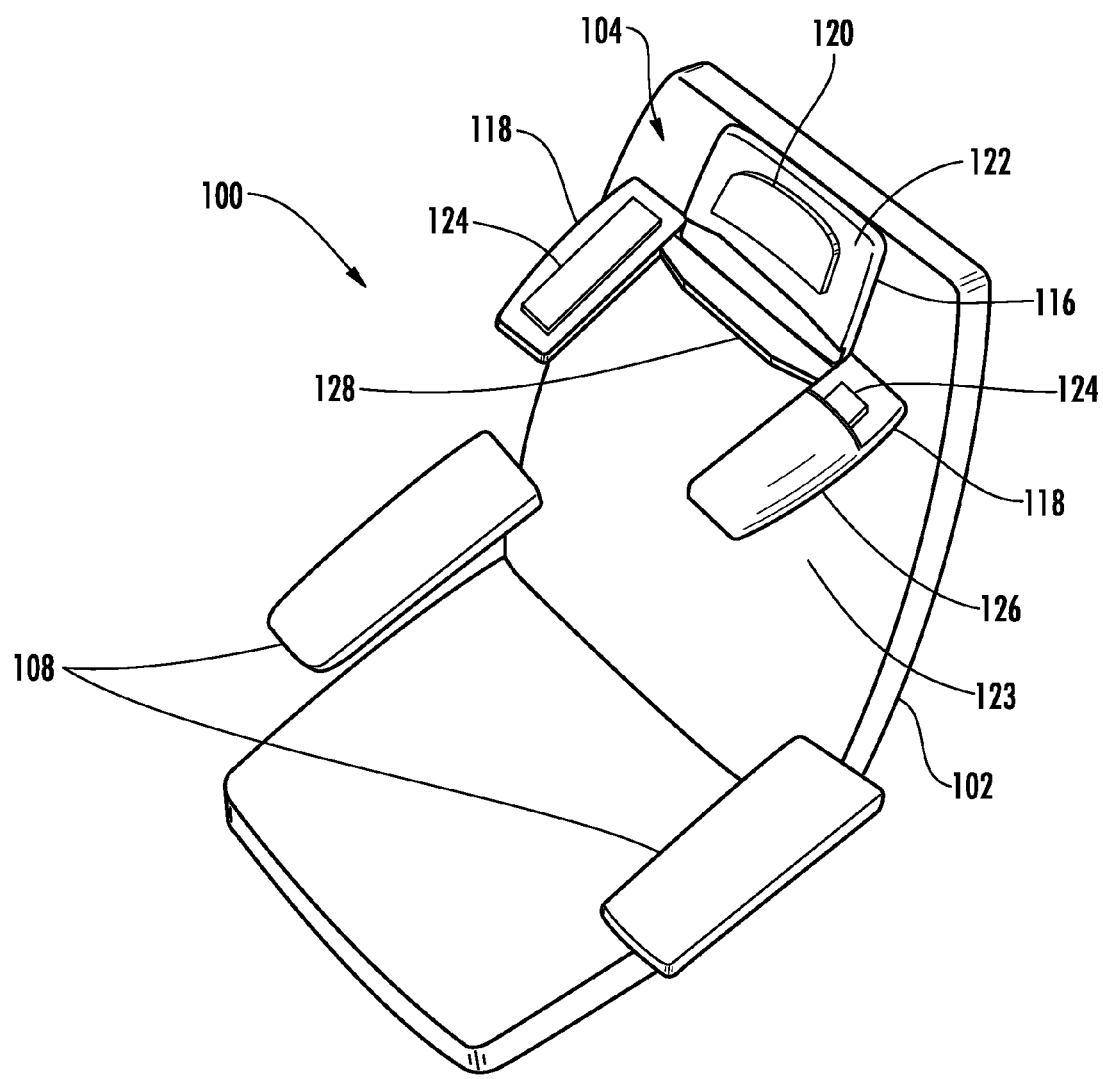
FIG. 1 is a perspective view of a passenger seat according to certain embodiments of the present invention, wherein the wings of the neck support structure are in a deployed position.

Embodiments of the invention provide passenger seats with an adjustable support structure for a passenger's neck or head. While the passenger seats are generally discussed for use with aircrafts, they are by no means so limited. Rather, embodiments of the passenger seats may be used in connection with any mode of transportation or otherwise as desired.

FIGS. 1-4 illustrate embodiments of a passenger seat 100. In these embodiments, the passenger seat 100 may comprise a seat back support 102 and a neck support structure 104. The passenger seat 100 may also comprise seat accessories, including but not limited to at least one cushion 106, at least one armrest 108, at least one passenger belt 110, and at least one leg 112. The passenger seat 100 may also exist within a passenger seat assembly 114 of one or more passenger seats 100. The passenger seat assembly 114 may also comprise seat accessories, including but not limited to the cushion 106, the armrest 108, the passenger belt 110, and the leg 112.

The seat back support 102 provides a foundation, form, and shape for the passenger seat 100 and provides support to a passenger's body. The seat back support 102 may have any suitable seat-like shape, such as the embodiments illustrated in FIG. 1. Throughout embodiments, the dimensions of the seat back support 102 may vary as needed. In some embodiments, the seat back support 102 may be linear. In some embodiments, the seat back support 102 may be curvilinear. The seat back support 102 may be formed of materials including but not limited to composite plastics, aluminum, stainless steel, other metallic materials, composite materials, or other similar materials. In some embodiments, the passenger belt 110 may be coupled to the seat back support 102. In some embodiments, the cushion 106 may be coupled to the seat back support 102. The cushion 106 may include any suitable cushion material that provides the desired amount of comfort and support to the passenger.

The neck support structure 104 is capable of providing support to a passenger's neck and head while the passenger utilizes the passenger seat 100. The neck support structure 104 may comprise a headrest 116 and at least one wing 118.

The headrest 116 provides support for the passenger's head and/or neck. The headrest 116 may be coupled to the seat back support 102 and may serve as a foundation for the wing 118. In some embodiments, the headrest 116 may be coupled to the seat back support 102 by a variety of mechanisms including but not limited to an adhesive, bolts, fasteners, screws, and other coupling mechanisms. In other embodiments, the headrest 116 and the seat back support 102 may be integrally formed so that the headrest 116 remains at a fixed position relative to the seat back support 102. In yet other embodiments, the headrest 116 may be pivotally coupled to the seat back support 102.

The headrest 116 may have any suitable cross-sectional shape including but not limited to circular, rectilinear, trapezoidal, other similar polygonal shape, or any irregular shape. In some embodiments, it may be suitable for the length and width of the cross-sectional shape of the headrest 116 to have differing dimensions. The depth of the headrest 116 may also vary throughout embodiments. The headrest 116 may be formed from a variety of materials, including but not limited to composite plastics, aluminum, stainless steel, other metallic materials, composite materials, or other similar materials. In some embodiments, a cushion 120 may be coupled to the headrest 116. The cushion 120 may include any suitable cushion material that provides the desired amount of comfort and support to the passenger.

The wing 118 is pivotally coupled to the headrest 116 so as to provide support for the passenger's head and/or neck. In some embodiments, the wing 118 may be coupled to the headrest 116 by a variety of mechanisms, including but not limited to hinges, fasteners, rods, and other pivotally coupling mechanisms. In some embodiments, the wing 118 may be pivotally coupled to the headrest 116 via a friction hinge, which relies on a constant friction force within the hinge to hold a position until an excessive torque is applied to overcome the hinge resistance torque and move the wing 118 to another position within its range of motion. As a result, the wing 118 may only be adjusted by direct, intentional force or manipulation by the passenger. In some embodiments, the friction force between the wing 118 and the headrest 116 will likewise prevent unintentional adjustment of the wing 118. In other embodiments, the wing 118 may be secured into place after adjustment by a variety of manners, including but not limited to a locking mechanism.

Figure 2:
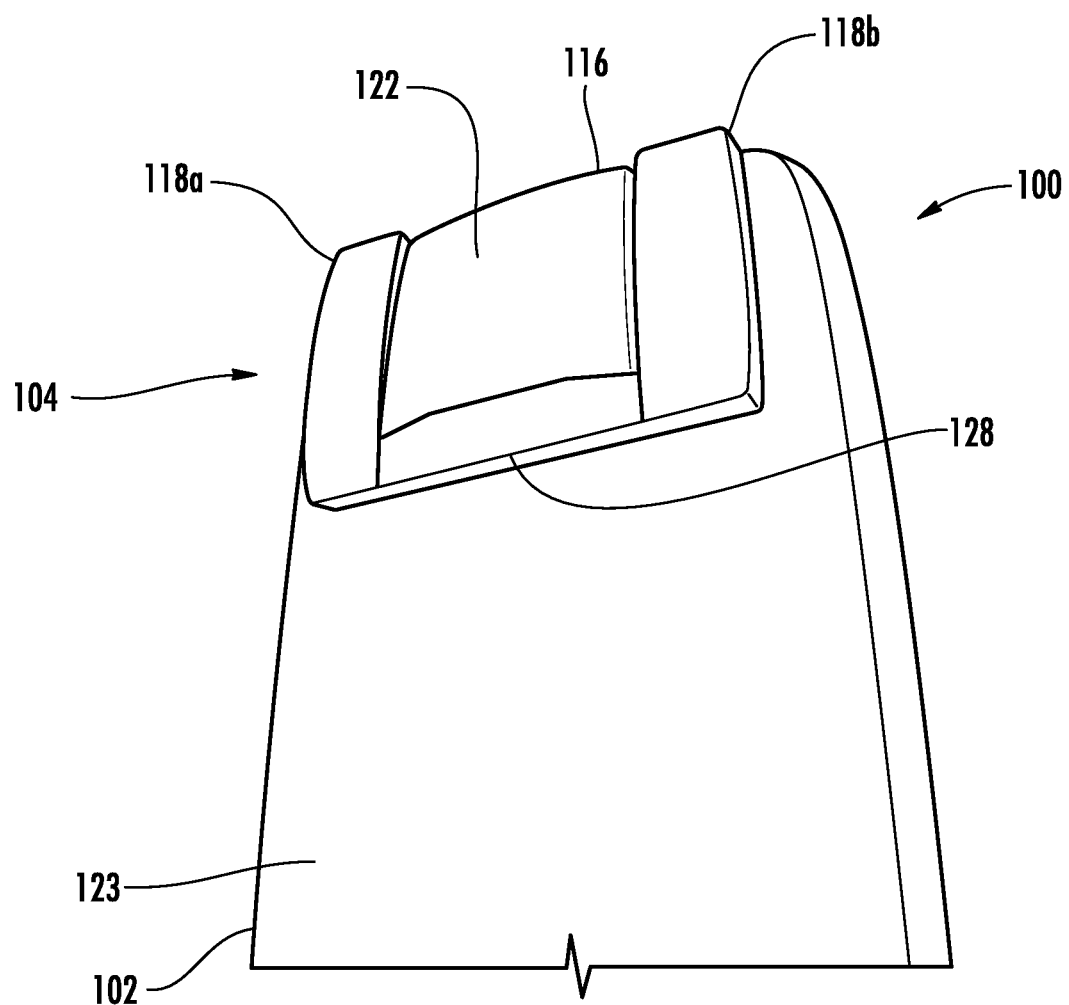
FIG. 2 is a front perspective view of a passenger seat according to other certain embodiments of the present invention, wherein the wings of the neck support structure are in a stowed position.

The position of the wing 118 may vary between a stowed position and a deployed position. In a stowed position, as illustrated in FIG. 2, the wing 118 is positioned approximately flush with a surface 122 of the headrest 116 or a surface 123 of the seat back support 102. In a deployed position, the wing 118 may be rotated some distance away from the surface 122 or the surface 123 to any suitable deployed position, ranging from a stowed position (as shown in FIG. 2) to a fully deployed position. In some embodiments, the wing 118 may rotate up to 90 degrees or less away from the surface 122 or the surface 123. In other embodiments, the wing 118 may rotate beyond 90 degrees.

Figure 3:
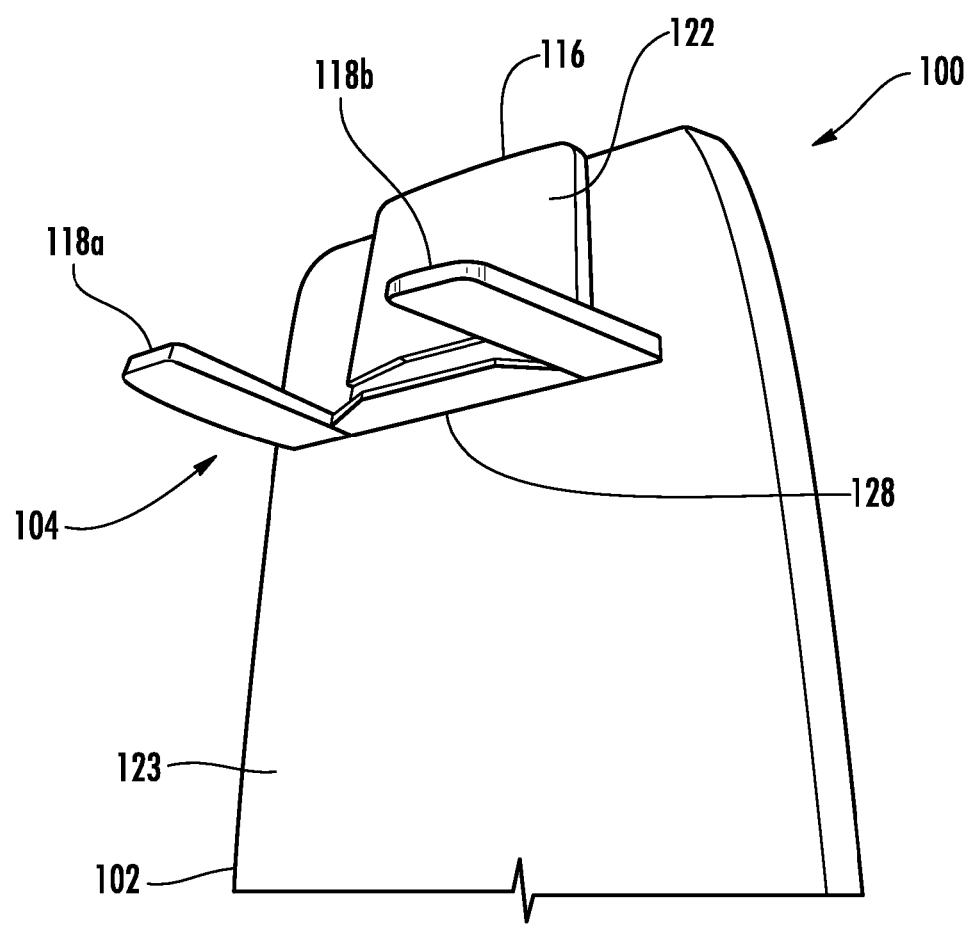
FIG. 3 is a front perspective view of the passenger seat of FIG. 2, wherein the wings of the neck support structure are in a deployed position.
Figure 4:
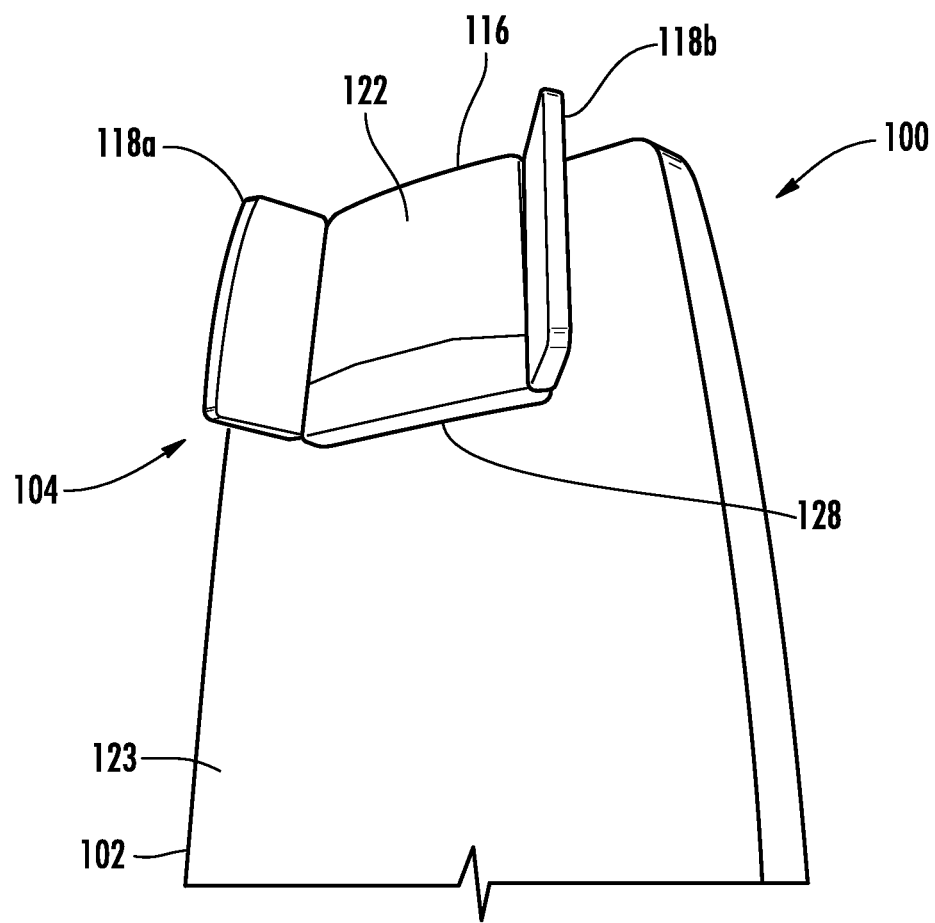
FIG. 4 is a front perspective view of the passenger seat of FIG. 2, wherein the wings of the neck support structure are in a deployed position.

In some embodiments, as illustrated in FIG. 3, the wing 118 may be coupled to the headrest 116 in a manner such that the wing 118 may rotate downwardly from a stowed position to a deployed position. In some embodiments, the wing 118 may be coupled to the headrest 116 in a manner such that the wing 118 may rotate upwardly from a stowed position to a deployed position. In some embodiments, as illustrated in FIG. 4, the wing 118 may be coupled to the headrest 116 in a manner such that the wing 118 may rotate laterally from a stowed position to a deployed position. In some embodiments, the wing 118 may be coupled to the headrest 116 in a manner such that the wing 118 may rotate downwardly or laterally from a stowed position to a deployed position. In some embodiments, the wing 118 may be coupled to the headrest 116 in a manner such that the wing 118 may rotate upwardly or laterally from a stowed position to a deployed position.

In some embodiments, the neck support structure 104 may comprise more than one wing 118. For example, in the embodiments illustrated in FIGS. 1 and FIGS. 2-4, the neck support structures 104 comprise two wings 118. In other embodiments, the neck support structure 104 may comprise three or more wings 118. In some embodiments, the wings 118 may be independent from one another, such that either wing 118 may operate independently of the other wing 118. In some embodiments, the wings 118 may be integrally formed, or otherwise connected to one another such that either wing 118 cannot rotate independently of the other wing 118 in at least one direction.

In some embodiments, two or more wings 118 may be connected by a connecting member 128. For example, in the embodiments illustrated in FIGS. 1 and FIGS. 2-4, the two wings 118 are connected by the connecting member 128 such that the first wing 118a cannot rotate downwardly independent of the second wing 118b. In some embodiments, either wing 118 may be pivotally coupled to the connecting member 128 in a manner such that either wing 118 may rotate independently of the other wing 118 in at least one lateral direction. The wing 118 may be coupled to the connecting member 128 by a variety of mechanisms, including but not limited to hinges, fasteners, rods, and other pivotally coupling mechanisms. In some embodiments, the wing 118 may be pivotally coupled to the connecting member 128 via a friction hinge, which relies on a constant friction force within the hinge to hold a position until an excessive torque is applied to overcome the hinge resistance torque and move the wing 118 to another position within its range of motion. As a result, the wing 118 may only be adjusted by direct, intentional force or manipulation by the passenger. In some embodiments, the friction force between the wing 118 and the connecting member 128 will likewise prevent unintentional adjustment of the wing 118. In other embodiments, the wing 118 may be secured into place after adjustment by a variety of manners, including but not limited to a locking mechanism.

The shape of the wing 118 may vary throughout embodiments. Moreover, in embodiments in which more than one wing 118 exist, the shape of each wing 118 may also vary within the embodiments. The wing 118 may have any suitable cross-sectional shape including but not limited to circular, rectilinear, trapezoidal, other similar polygonal shape, or any irregular shape. In some embodiments, it may be suitable for the length and width of the cross-sectional shape of the wing 118 to have differing dimensions. The wing 118 may be formed from a variety of materials, including but not limited to composite plastics, aluminum, stainless steel, other metallic materials, composite materials, or other similar materials. In some embodiments, the wing 118 may be formed from a variety of flexible materials, which may allow the shape of at least a portion of the wing 118 to be manipulated by the passenger. Such materials may include but are not limited to wire, aluminum, other malleable metallic materials, composite materials, plastics, or other similar flexible materials. In some embodiments, a cushion 124 may be coupled to the wing 118. The cushion 124 may include any suitable cushion material that provides the desired amount of comfort and support to the passenger.

In some embodiments, a cover 126 may be removably coupled to the wing 118. The cover 126 may be formed from a variety of materials, including but not limited to any number of fabrics, composite plastics, composite materials, or other similar materials. The cover 126 may provide for repeated, hygienic use of the wing 118. For example, the cover 126 may be coupled to the wing 118 for use by a first passenger. After completion of use of the wing 118 by the first passenger, the cover 126 may be removed and replaced with a new, clean cover 126 for use by a second passenger. The cover 126 may be removably coupled to the wing 118 by a number of mechanisms including but not limited to an elastic mechanism, an adhesive, a compression mechanism, and other similar mechanisms.

In use, a passenger may utilize the neck support structure 104 to support the passenger's head or neck. For example, in the deployed position illustrated in FIG. 3, the wings 118 provide direct support to a passenger who wishes to tilt or lean his or her head or neck. The passenger may sit in the passenger seat 100, downwardly rotate the wings 118 to the illustrated deployed position, then tilt his or her head or neck to the right or left and find it supported by either wing 118. Such support may eliminate the need for a personal pillow. Similarly, in the alternative deployed position illustrated in FIG. 4, the wings 118 provide direct support to a passenger who wishes to tilt or lean his or her head or neck to the right of left. The passenger may sit in the passenger seat 100, laterally rotate the wings 118 to the illustrated deployed position, then tilt his or her head or neck to the right or left and find it supported by either wing 118. Notably, the wings 118 of the embodiments illustrated in FIG. 4 are connected via the connecting member 128, such that each wing 118 may rotate laterally independent of the other wing 118.

In some embodiments, the passenger may adjust the wing 118 and neck support structure 104 by physically grasping the wing 118 and manually rotating the wing 118 some distance away from the surface 122 or the surface 123. In other embodiments, the neck support structure 104 may be electronically equipped such that the passenger may rotate the wing 118 some distance away from the surface 122 or the surface 123 via an automated control mechanism.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat comprising:
   (a) a seat back support; and
   (b) a neck support structure comprising:
      (i) a headrest fixedly coupled to the seat back support and configured to provide support for a passenger's head;
      (ii) planar connecting member pivotally coupled to a lower end of the headrest so that the connecting member pivots downwardly from a stowed position to a deployed position adjacent a passenger's neck, wherein the connecting member is configured to allow contact between the passenger's head and the headrest when the connecting member is in the stowed position and the deployed position; and
      (iii) a pair of wings pivotally coupled to opposing lateral ends of the connecting member via friction hinges so that each wing pivots from a stowed position to a deployed position relative to an adjacent lateral end of the connecting member, wherein the pair of wings are configured to provide lateral support for the passenger's neck in the deployed position.

2. The passenger seat of claim 1, wherein each wing of the pair of wings independently pivots relative to the adjacent lateral end of the connecting member.

3. The passenger seat of claim 1, wherein the pair of wings are formed from a flexible material.

4. The passenger seat of claim 1, wherein each wing pivots up to 90 degrees from the stowed position to the deployed position relative to the adjacent lateral end of the connecting member.

5. The passenger seat of claim 1, wherein each wing manually pivots from the stowed position to the deployed position relative to the adjacent lateral end of the connecting member.

6. The passenger seat of claim 1, wherein a cushion is coupled to each wing.

7. The passenger seat of claim 1, wherein the headrest is integrally formed with the seat back support.

8. The passenger seat of claim 1, wherein a cushion is coupled to the headrest.

9. A passenger seat comprising:
   (a) a seat back support; and
   (b) a neck support structure comprising:
      (i) a headrest fixedly coupled to the seat back support and configured to provide support for a passenger's head, the headrest comprising a recess proximate a lower end;
      (ii) a planar connecting member shaped to fit within the recess in a stowed position and pivotally coupled to the lower end of the headrest so that the connecting member rotates downwardly from the stowed position within the recess to a deployed position adjacent a passenger's neck, wherein the connecting member is configured to allow contact between the passenger's head and the headrest when the connecting member is in the stowed position and the deployed position; and
      (iii) a pair of wings pivotally coupled to opposing lateral ends of the connecting member so that each wing pivots from a stowed position to a deployed position relative to an adjacent lateral end of the connecting member, wherein the pair of wings are configured to provide lateral support for the passenger's neck in the deployed position.

10. The passenger seat of claim 9, wherein the pair of wings are pivotally coupled to the opposing lateral ends of the connecting member via friction hinges.

11. A method of operating a neck support structure for a passenger seat, the neck support structure comprising a headrest fixedly coupled to a seat back support of the passenger seat and configured to provide support for a passenger's head, a planar connecting member pivotally coupled to a lower end of the headrest, and a pair of wings pivotally coupled to opposing lateral ends of the connecting member, the steps comprising:
   (a) pivoting the connecting member downwardly from a stowed position to a deployed position adjacent a passenger's neck, wherein the connecting member is configured to allow contact between the passenger's head and the headrest when the connecting member is in the stowed position and the deployed position;
   (b) pivoting a first wing of the pair of wings from a stowed position to a deployed position relative to an adjacent lateral end of the connecting member, wherein the first wing is configured to provide lateral support for the passenger's neck in the deployed position.

12. The method of claim 11, further comprising pivoting a second wing of the pair of wings from a stowed position to a deployed position relative to the adjacent lateral end of the connecting member, wherein the second wing is configured to provide lateral support for the passenger's neck in the deployed position.

13. The method of claim 11, wherein each wing of the pair of wings independently rotates relative to the adjacent lateral end of the connecting member.

14. The method of claim 11, wherein the pair of wings are pivotally coupled to the opposing lateral ends of the connecting member via friction hinges.

15. The method of claim 11, wherein each wing pivots up to 90 degrees from the stowed position to the deployed position relative to the adjacent lateral end of the connecting member.

* * * * *